United States Patent [19]

Becker et al.

[11] 4,105,752
[45] Aug. 8, 1978

[54] ALUMINUM CHLORIDE PRODUCTION

[75] Inventors: Aaron J. Becker, Monroeville; Subodh K. Das, Natrona Heights, both of Pa.

[73] Assignee: Aluminum Company of America, Pittsburgh, Pa.

[21] Appl. No.: 752,544

[22] Filed: Dec. 20, 1976

[51] Int. Cl.$^2$ .................... C01F 7/56; C01B 31/20
[52] U.S. Cl. .................... 423/496; 423/137; 423/136; 423/437
[58] Field of Search ............ 423/136, 496, 137, 437; 252/444

[56] References Cited

U.S. PATENT DOCUMENTS

| B 310,271 | 1/1975 | Broughton et al. ............ 252/444 |
| 1,133,049 | 3/1915 | McKee ...................... 252/444 X |
| 1,509,605 | 9/1924 | McKee ...................... 423/136 |
| 1,782,493 | 11/1930 | van Loon .................. 252/444 |
| 1,902,068 | 3/1933 | Geis ........................ 252/444 |
| 2,300,600 | 11/1942 | Steely et al. .............. 252/444 |
| 3,168,485 | 2/1965 | Knobloch et al. ............ 252/444 |
| 3,760,066 | 9/1973 | Calcagno et al. ............ 423/496 |
| 3,811,916 | 5/1974 | Russell et al. ............. 423/496 X |
| 3,937,786 | 2/1976 | Nemecz et al. .............. 423/136 |

FOREIGN PATENT DOCUMENTS

| 906,754 | 8/1972 | Canada ...................... 252/444 |
| 166,202 | 1921 | United Kingdom. |

*Primary Examiner*—Edward Stern
*Attorney, Agent, or Firm*—Andrew Alexander

[57] ABSTRACT

A process for the production of aluminum chloride comprises providing a mixture of high purity activated carbon and alumina and bubbling chlorine gas therethrough, the mixture being kept at a temperature in the range of 500° to 775° C. Aluminum chloride is removed from the mixture as a vapor and condensed.

6 Claims, 1 Drawing Figure

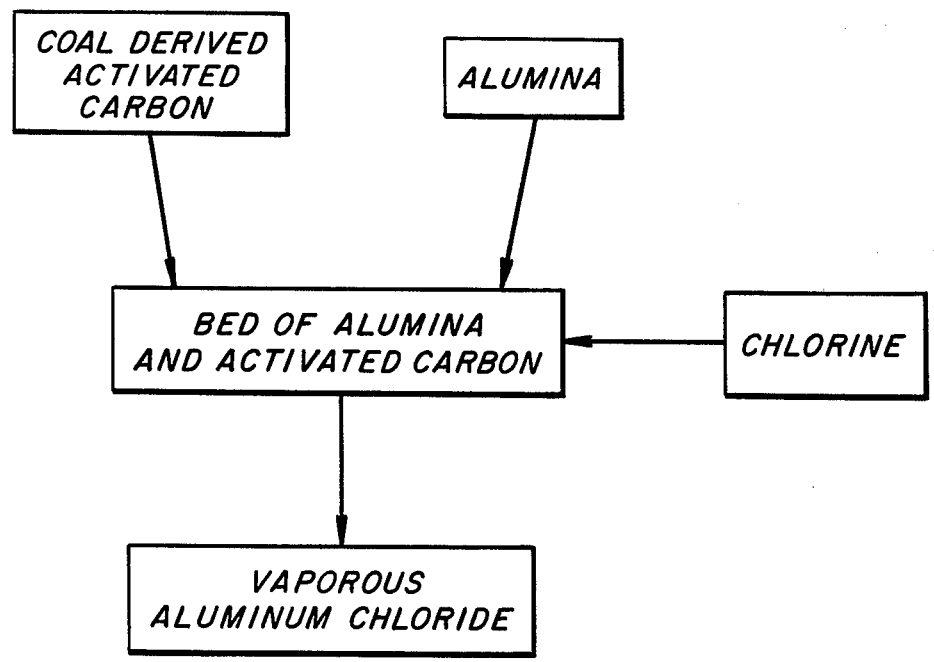

ALUMINUM CHLORIDE PRODUCTION

INTRODUCTION

This invention relates to aluminum chloride and more particularly to a method of producing aluminum chloride using activated carbon as a reducing agent.

Considerable interest has existed through the years in aluminum chloride and in the electrolytic production of aluminum from aluminum chloride. However, one problem encountered in this process is the economic production of aluminum chloride in order to effect economic production of the aluminum.

In the prior art, Russell et al in U.S. Pat. No. 3,842,163 teach the production of a high purity aluminum chloride useful in the electrolytic production of aluminum. The aluminum chloride is produced by feeding substantially pure alumina coated or impregnated with carbon into a fluidized bed and passing chlorine therethrough. A preferred source of carbon coated or impregnated on the alumina is a liquid hydrocarbon. However, because of the concern over the availability and cost of such liquid hydrocarbon, considerable effort has been expanded in developing new sources of carbon suitable for use with alumina for the production of aluminum chloride. Coal has been considered for such application but because of the impurities therein, for example, iron and silicon, commercial utilization of such has been seriously impeded. Also, considerable difficulty has been encountered in effecting the aluminum chloride production reaction where two solid materials are required to react with the gas. As noted in the aforementioned patent, such reaction is known to proceed at lower temperatures if the carbon is first deposited on the alumina. However, such procedures, which often involve cracking or coking to produce carbon coated alumina, are often attended by very high cracking temperatures as well as the preliminary step to coat or impregnate the alumina with carbon.

It is also known in the prior art that aluminum chloride can be produced by the use of activated carbon, aluminum bearing materials and chlorine. For example, McKee in U.S. Pat. No. 1,509,605 discloses that a black-ash residue treated with an acid, e.g. hydrochloric acid, is more active than ordinary carbonaceous material, such as coke, in the production of aluminum chloride using bauxite and chlorine. However, the black-ash referred to is that derived from a pulp making process.

Thus, it can be seen from the above discussion that there is a great need for a process utilizing an economical source of carbonaceous material in the process for producing aluminum chloride.

SUMMARY OF THE INVENTION

An object of this invention is to provide a highly economical process for the production of aluminum chloride.

A further object of this invention is to utilize coal as a source of carbonaceous material in the production of aluminum chloride.

Yet another object of this invention is to utilize coal as a source of activated carbonaceous material in the production of high purity aluminum chloride.

In accordance with these objectives the present invention provides a process for the production of aluminum chloride. The process includes providing a mixture of coal-derived, activated carbon and alumina and bubbling therethrough chloride gas, the mixture being kept at a temperature in the range of 500° to 775° C. Aluminum chloride, produced in vapor form, is removed and subsequently condensed.

BRIEF DESCRIPTION OF THE DRAWING

In the description below, reference is made to the sole FIGURE which is a flow chart illustrating a method of producing aluminum chloride in accordance with the present invention.

DETAILED DESCRIPTION OF THE PREFERRED EMBODIMENTS

From the drawing it will be seen that, in accordance with the present invention, coal-derived activated carbon and alumina are mixed and chlorine gas is bubbled therethrough, the mixture being kept at a sufficiently high temperature to provide aluminum chloride. The aluminum chloride is removed from the mixture as a vapor and is subsequently condensed.

The coal-derived activated carbon referred to is preferably of high purity. That is, elements which would react with the chlorine and contaminate the aluminum chloride are preferably removed prior to the activated carbon being used to produce the aluminum chloride. Such elements normally present in coal which can contaminate the aluminum chloride include iron, silicon, calcium and sodium, etc. These impurities not only represent a loss of valuable chlorine in terms of the iron, silicon, calcium and sodium chloride, but also result in by-products which markedly add to the difficulty and expense of providing high purity aluminum chloride and subsequent separation operations.

The coal from which the activated carbon is derived includes sources such as anthracite, bituminous, lignite and brown coal or the like. However, as noted above, these sources of coal should be purified in order to provide high purity aluminum chloride. In the present invention, preferably the impurities are removed from the coal by first grinding and screening to remove coarse particles. Preferably the particle size is less than 14 mesh (Tyler Series) and more preferably less than 48 mesh (Tyler Series) to provide maximum surface area for purifying. Thereafter, the impurities can be reduced to a low level by first subjecting the coal to an initial beneficiation or mechanical separation or the like which steps are well known to those skilled in the art. Thereafter, the remaining impurities in the coal can be further reduced by subjecting it to leaching solutions. For example, such leaching solutions can include a single treatment or a series of treatments depending on the level of purity desired. For instance, if it is desired to lower the sulfur content, the coal can be subjected to a caustic treatment. Thereafter, the coal can be subjected to a mineral acid treatment to further reduce the impurities. The mineral acid treatment employs at least one acid selected from the group consisting of HCl, HN0$_3$, HF and H$_2$SO$_4$. It should be understood that it may be advantageous to treat the coal directly with mineral acid after the initial beneficiation.

In the process of the present invention, it is preferred to use highly purified activated carbon. Such activated carbon can be prepared by subjecting the beneficiated coal to a solution containing hydrofluoric acid and at least one oxidizing agent selected from the group consisting of nitric acid, hydrogen peroxide and ferric sulfate. Removal of impurities can be facilitated by bubbling a gaseous material such as air or oxygen through this solution during the leaching process. With respect to concentration of the leaching solution, it can contain about 2 to 25 wt.% nitric acid and 0.5 to 10 wt.% hydrofluoric acid, the remainder water. The coal should be contacted with this solution for a time period in the range of 15 to 120 minutes and at a temperature in the range of 20° to 100° C with a ratio of volume of leaching solution in milliliters to weight of coal in grams in the range of 5:1 to 20:1. After leaching, 50 to 70 wt.% of the solution is separated from the coal in order to leave therein residual leaching solution and, without washing, the coal is subjected to a temperature in the range of 80° to 140° C for 5 to 120 minutes and then calcined at a temperature in the range of 550° to 775° C for 5 to 120 minutes to provide the activated carbon. This treatment produces activated carbon having a surface area of 200 to 600 m²/gm and a dry bulk density typically in the range of 0.25 to 0.95 gms/cc.

With respect to the alumina or aluminum oxide, it is preferred that most of the impurities be removed therefrom prior to its use in the present invention. Thus, a highly preferred form of aluminum oxide for use in the present invention is alumina which is intended to mean an aluminum oxide product after the same has been extracted from its ores. The well known Bayer process is one source of such alumina in which process, bauxite ore is extracted with caustic soda to selectively dissolve the aluminum content as sodium aluminate while leaving behind impurities such as iron, silicon and titanium. In this process, alumina is recovered as Bayer hydrate, i.e., $Al(OH)_3$ which is subsequently calcined to remove most of the the water for reasons which will be discussed below.

It is preferred that the alumina used in the present invention have a low hydrogen and water content. Hydrogen or hydrogen bearing compounds react to form hydrogen chloride and, as with the impurities in the activated carbon referred to above, can result in the loss of valuable chlorine. Thus, alumina suitable for use in this process is preferably made from alumina hydrate calcined to substantially remove hydrogen or hydrogen bearing compounds such as water. Such calcining can be carried out in kilns of furnaces at a temperature of 600° to 1200° C or higher. It is preferred to carry out such calcining such that gamma type alumina predominates, since this type alumina is preferred because of its higher reactivity. Thus, in a preferred embodiment the alumina should have a surface area of 70 to 120 m²/g. Such surface area is desirable since, with the high surface area of the activated carbon, it provides more surface area to react with the chlorine gas.

A preferred source of chlorine suitable for use in the present invention is $Cl_2$. However, other chlorine bearing materials such a $COCl_2$ and $CCl_4$ or mixtures thereof can be used. Preferably, the chlorine used is in the gaseous form.

In the method of carrying out the present invention to form aluminum chloride, alumina and activated carbon are mixed and chlorine gas introduced thereto. Preferably, the gas is introduced at a rate sufficient to fluidize the mixture and to provide maximum flow of gas without producing substantial entrainment of the particles of the mixture in the gas. Thus, the chlorination reaction is carried out such that chlorine and carbon react with the alumina to produce a gaseous reaction mixture of effluent and carbon oxides which emanate from the reaction chamber. Preferably, the temperature and carbon content should be such that the gaseous effluent contains aluminum chloride and a substantial amount of carbon dioxide. That is, it is preferred that the formation of carbon monoxide and phosgene be kept to a minimum. Thus, the reaction temperature should be maintained in the range of 500° to 775° C and preferably in the range of 550° to 650° C with a typical reaction temperature being about 580° C.

It should be noted that it is important to control the reaction temperature within the above temperature ranges. For example, if the reaction temperature is permitted to exceed the higher temperature, deactivation of the activated carbn can occur, seriously interfering with the aluminum chloride production.

With respect to the mixture of alumina and activated carbon, it should contain from 70 to 90 wt.% alumina and 10 to 30 wt.% activated carbon with a preferred amount of activated carbon being in the range of 15 to 25 wt.%.

It should be noted that the particle size of carbon should be such that the carbon does not segregate or separate from the alumina during fluidization. For example, if the carbon is provided in too fine a mesh size, it is removed from the bed by the fluidizing gas. Thus, carbon should have a size range similar or larger than the alumina. For example, if the particle size of alumina is less than 48 mesh and greater than 325, the carbon particle should have a similar size range. However, in this range carbon particle size up to −28 mesh can be used.

One of the significant aspects of the present invention resides in the completeness of reaction. That is, by the process of the present invention, carbon oxides emanating from the fluidized bed are substantially carbon dioxide with carbon monoxide constituting normally not more than 33 vol.% of said oxides and typically containing carbon monoxide in the range of 5 to 20 vol%. Also, the amount of phosgene formed is exceptionally low. It will be understood that the amounts of phosgene and carbon monoxide should be kept to the lowest possible level because phosgene represents a waste of valuable chlorine and carbon monoxide represents a waste of carbon. Also, these compounds are highly toxic and can, in addition, contaminate the aluminum chloride recovered.

While the inventors do not necessarily wish to be held to any theory of invention, it is believed that the high reactivity of the present invention results from high surface areas of both the alumina and the activated carbon being available as reaction sites. That is, both surfaces of the alumina and carbon are readily available for reaction with the chlorine. Also, in comparison to alumina, and particularly that form wherein the carbon is coated or coked onto the alumina, the chlorine does not have to permeate the coating of such carbon to react at the carbon-alumina interface. Furthermore, upon reacting at such interface with the resultant formation of $AlCl_3$ and $CO_2$, these reactants do not have to diffuse or penetrate the carbon layer once more in order to escape from the reactants.

The following examples are further illustrative of the invention.

EXAMPLE 1

A sample of Indiana No. 6 coal was ground to −48 mesh (Tyler Series) and leached for 60 minutes in a solution at 85° C containing 18 wt.% nitric acid and 4 wt.% hydrofluoric acid, the remainder essentially water. During the leaching, air was bubbled through the slurry. The leaching solution was removed from the leached coal by filtering. After leaching, the sample was analyzed and ash was reduced from 4.3 to 0.16 wt.%, Fe was lowered from 0.87 to 0.01 wt.% and Si from 0.7 to 0.004 wt.%. The leached coal was subjected to a temperature of 108° C for 2 hours and then rapidly heated to a temperature of 650° C for 2 hours to produce activated carbon. A bed containing 80 wt.% alumina (containing less than 0.5% alpha alumina) and 20 wt.% activated carbon was fluidized by flowing chlorine gas therethrough. The flow rate of chlorine was 0.95 liters/min. and the temperature of the fluidized bed was 650° C. The effluent emanating therefrom was collected, analyzed and it was found that 76 wt.% of the chlorine added to the bed was converted to $AlCl_3$ and about 86% of the carbon oxide was carbon dioxide.

EXAMPLE 2

A sample of lignite, previously beneficiated to an impurity level having an ash content of 13.0 wt.%, was ground to −28/+48 mesh (Tyler Series) and leached for 30 minutes in a solution at 23° C containing 20 wt.% nitric acid and 30 wt.% hydrochloric acid, the remainder essentially water. The leaching solution was removed from the leached coal by filtering. The leached coal was thereafter treated at a temperature of 108° C for 2 hours and then rapidly heated to a temperature of 650° C for a period of 2 hours to produce activated carbon. A bed containing 80 wt.% alumina (the alumina contained less than 0.5 wt.% alpha alumina) and 20 wt.% activated carbon was fluidized by flowing chlorine gas therethrough. The flow rate of chlorine was 3 liters/min. and the temperature of the fluidized bed was 585° C. The effluent emanating from the bed was analyzed and it was found that almost 100% of the chlorine added was converted to $AlCl_3$ and about 90% of the carbon oxide was carbon dioxide.

EXAMPLE 3

This example was the same as Example 2 except alumina containing 24 wt.% alpha alumina was used. It was found that 45 wt.% of the chlorine added was converted to $AlCl_3$.

While the invention has been described in terms of preferred embodiments, the claims appended hereto are intended to encompass all embodiments which fall within the scope of the invention.

Having thus described our invention and certain embodiments thereof, we claim:

1. A process for the production of aluminum chloride from a source of alumina, coal-derived activated carbon and chlorine comprising:
    (a) providing a fluidized mixture of coal-derived activated carbon and a source of alumina, the carbon having a size range similar to or larger than the alumina, said activated carbon prepared by:
        (i) contacting coal with a leaching solution to remove impurities therefrom, the solution being employed at a temperature of 20° to 100° C and at a ratio of solution in milliliters to coal in grams in the range of 5:1 to 20:1;
        (ii) removing the leaching solution from the coal and leaving therein residual leaching solution; and
        (iii) calcining the coal at a temperature in the range of 550° to 775° C to provide activated carbon having a dry bulk density in the range of 0.25 to 0.95 gms/cc.
    (b) maintaining the mixture at a temperature in the range of 500° to 775° C;
    (c) bubbling a source of chlorine through the mixture thereby reacting said chlorine with said alumina to produce aluminum chloride vapor; and
    (d) condensing said aluminum chloride vapor.

2. The process according to claim 1 wherein the leaching solution is a mineral acid.

3. The process according to claim 1 wherein the leaching solution contains at least one mineral acid selected from the group consisting of HCl, $HNO_3$, HF and $H_2SO_4$.

4. The process according to claim 2 wherein 50 to 70 wt.% of the leaching solution is removed from the coal.

5. The process according to claim 2 wherein after step (a) (ii), the leached coal is subjected to a temperature in the range of 80° to 140° C.

6. A process for the production of aluminum chloride from a source of alumina, coal-derived activated carbon and chlorine comprising:
    (a) providing a fluidized mixture containing 70 to 90 wt.% alumina and 10 to 30 wt.% activated carbon, the carbon having a size range similar to or larger than the alumina, the activated carbon prepared by:
        (i) contacting particles of coal with a leaching solution for a period of 15 to 120 minutes, the solution containing 0.5 to 10 wt.% hydrofluoric acid and 2 to 25 wt.% nitric acid, the remainder essentially water, said solution maintained at a temperature in the range of 20° to 100° C and being employed so as to provide a ratio of solution in milliliters to coal in grams in the range of 5:1 to 20:1, and during said contacting, bubbling therethrough a gaseous oxidizing material selected from the group consisting of air and oxygen;
        (ii) removing 50 to 70 wt.% of the leaching solution from the coal particles;
        (iii) subjecting the coal particles to a temperature in the range of 80° to 140° C; and
        (iv) calcining the coal particles at a temperature in the range of 550° to 775° C to provide activated carbon having a dry bulk density in the range of 0.25 to 0.95 gms/cc.
    (b) maintaining the mixture at a temperature in the range of 500° to 775° C;
    (c) bubbling a source of chlorine through the mixture thereby reacting said chlorine with said alumina to produce aluminum chloride vapor, the reaction being controlled so that carbon oxides emanating therefrom are not more than 33 vol.% CO; and
    (d) condensing said aluminum chloride vapor.

* * * * *